United States Patent [19]

Morikawa et al.

[11] 3,928,002
[45] Dec. 23, 1975

[54] LOW-TEMPERATURE STEAM REFORMING PROCESS FOR HYDROCARBONS

[75] Inventors: Kiyoshi Morikawa, Fujisawa; Akio Furuta, Yokohama; Hideyuki Matsumoto, Tokyo, all of Japan

[73] Assignees: Japan Gasoline Co., Ltd.; Nikki Chemical Co., Ltd., both of Tokyo, Japan

[22] Filed: Nov. 21, 1973

[21] Appl. No.: 417,768

[30] Foreign Application Priority Data
Nov. 28, 1972 Japan.............................. 47-118573

[52] U.S. Cl.................................. 48/214; 252/473
[51] Int. Cl.² ........................................... C01B 2/14
[58] Field of Search .............. 48/214; 252/473, 373; 423/654

[56] References Cited
UNITED STATES PATENTS

| | | |
|---|---|---|
| 2,083,795 | 6/1937 | Schiller et al....................... 423/654 |
| 3,429,680 | 2/1969 | Watanabe et al..................... 48/214 |
| 3,444,099 | 5/1969 | Taylor et al. .......................... 48/214 |
| 3,506,418 | 4/1970 | Billings ................................. 48/214 |
| 3,744,981 | 7/1973 | Ward .................................... 48/214 |
| 3,840,356 | 10/1974 | Bernussett et al. ................... 48/214 |
| 3,876,557 | 4/1975 | Bland............................. 252/473 X |

*Primary Examiner*—S. Leon Bashore
*Assistant Examiner*—Peter F. Kratz
*Attorney, Agent, or Firm*—Woodhams, Blanchard and Flynn

[57] ABSTRACT

A process of manufacturing a methane-containing gas, which comprises introducing hydrocarbons having at least 2 carbon atoms per molecule and steam preheated at a temperature in the range of 250° to 600°C into a steam reforming reactor (or reactors) packed with nickel-magnesia binary catalyst and effecting steam reforming reaction of said hydrocarbons while maintaining the temperature of the catalyst bed of said reactor(s) in the range of 300°–600°C.

5 Claims, No Drawings

LOW-TEMPERATURE STEAM REFORMING PROCESS FOR HYDROCARBONS

BACKGROUND OF THE INVENTION

1. Field of the Invention

The present invention relates to a process of catalytic steam reforming of hydrocarbons having at least 2 carbon atoms per molecule at a temperature in the range of 300°–600°C, and to be more precise, it relates to a process of manufacturing a methane-containing gas — particularly a methane-rich gas — by, for instance, adiabatically steam-reforming the feed hydrocarbons in the presence of a novel nickel-magnesia catalyst capable of demonstrating superb effects in the low-temperature steam reforming reaction.

2. Description of the Prior Art

There have hitherto been proposed a variety of processes of manufacturing a methane-containing gas by subjecting feed hydrocarbons to low-temperature steam reforming reaction in the presence of a nickel catalyst. To cite instances, there are Japanese Patent Publication No. 11047/1965 teaching the employment of a catalyst consisting of nickel-alumina-lanthanide rare earth, Japanese Patent Publication No. 11048/1965 teaching the employment of a catalyst consisting of nickel-alumina-iron, Japanese Patent Publication No. 17737/1969 teaching the employment of a catalyst consisting of nickel-alumina-alkaline earth metal, Japanese Patent Publication No. 19174/1970 teaching the employment of a catalyst consisting of nickel-alumina-aluminum, and so on.

However, the employment of these conventional catalysts in performing the low-temperature steam reforming reaction over a long period of time — particularly a low-temperature steam reforming reaction under high pressure — has shown a tendency to develop some unstable factors such as degeneration of the catalyst per se or deposition of carbonaceous matters on the catalyst, etc.

SUMMARY OF THE INVENTION

The present invention relates to a process of manufacturing a methane-containing gas, which comprises introducing hydrocarbons having at least 2 carbon atoms per molecule and steam preheated at a temperature in the range of 250° to 600°C in the ratio, in terms of $H_2O/C$ (mole/atom), of 0.9 to 5.0 into a steam reforming reactor (or reactors) packed with a nickel-magnesia catalyst in which the atomic ratio of nickel per atom of magnesium is in the range of 0.5 to 5.0, — preferably 1.0 to 3.0 and effecting steam reforming of said feed hydrocarbons by applying a pressure for reaction in the range of 10 to 100 Kg/cm².G while maintaining the temperature of the catalyst bed of said reactor(s) in the range of 300° to 600°C, — preferably 400° to 470°C.

DETAILED DESCRIPTION OF THE INVENTION

The object of the present invention is to provide a process of manufacturing a methane-containing gas — particularly a methane-rich gas — by, for instance, adiabatically steam-reforming the feed hydrocarbons in the presence of a novel nickel-containing catalyst capable of effectively controlling the development of unstable factors as set forth above. In other words, the low-temperature steam reforming process in accordance with the present invention is characterized in that, in the process of manufacturing a methane-containing gas by introducing hydrocarbons having at least 2 carbon atoms per molecule along with steam as preheated at a temperature in the range of 250° to 600°C into a steam reforming reactor(s) packed with a nickel-containing catalyst and effecting steam reforming reaction of said hydrocarbons while maintaining the temperature of the catalyst bed of said reactor(s) in the range of 300° to 600°C, — preferably 400° to 570°C, said reforming reaction being effected in the presence of a nickel-magnesia catalyst in which the atomic ratio of nickel per atom of magnesium (hereinafter noted as Ni/Mg) is in the range of 0.5 to 5.0 — preferably 1.0 –3.0.

As the said hydrocarbons having at least 2 carbon atoms per molecule to be treated through the process under the present invention include refinery off gas, LPG, light naphtha, heavy naphtha, kerosene, etc.

The ratio of steam to hydrocarbon in terms of $H_2O/C$ to be introduced into the steam reforming reactor(s) (to wit, the number of moles of steam to the number of moles of carbon atoms of the feed hydrocarbon) is desirably in the range of 0.9 to 5.0.

Said novel nickel-magnesia catalyst for use in the process under the present invention may be expressed by Ni-MgO and/or Ni-NiO-MgO at the point of time when it has been activated through reduction operation, and MgO therein is an active magnesia which can accelerate said low-temperature steam reforming reaction.

Apart from the quantitative ratio and viewed from the point of the components of the catalyst alone, a process of steam reforming hydrocarbons by the use of a binary catalyst such as applied to the process under the present invention has already been disclosed in U.S. Pat. No. 2,083,795, etc. However, said U.S. Pat. No. 2,083,795, etc., relate to a process of manufacturing hydrogen or hydrogen-rich gas by subjecting hydrocarbons to high-temperature steam reforming reaction; they do not teach any art relating to the low-temperature steam reforming process for the purpose of manufacturing a methane-containing gas — particularly a methane-rich gas such as intended by the process under the present invention.

Besides, the catalysts employed for these known processes are quite different from that for use in the process of the present invention in the ratio of components of nickel and magnesia, to wit, the atomic ratio of nickel per atom of magnesium. The inventors of the present invention have energetically made a study of the ratio of components of nickel and magnesia to compose a catalyst of this type, and as a result, they have discovered that, as is verified by the evaluation of the below mentioned comparative tests, the most effective atomic ratio of Ni to Mg to be applied to the low-temperature steam reforming reaction according to the present invention is in the range of 0.5 to 5.0 — preferably 1.0 to 3.0.

In the case where said atomic ratio of Ni to Mg is less than 0.5, a sufficient low-temperature activity of the catalyst cannot be expected, while in the case where said atomic ratio of Ni to Mg is more than 5.0, there is seen a tendency of carbonaceous matters to deposit on the surface of the catalyst with the progress of said reforming reaction, resulting in deterioration of the activity of the catalyst.

Further, it has been confirmed that said nickel-magnesia catalyst of the present invention can serve efficiently to effect the low-temperature steam reforming reaction under the pressure for reaction in the range of 10 to 100 Kg/cm$^2$.G, and particularly it demonstrates such properties as high activity and high stability under the condition of high pressure in the range of 30 to 100 Kg/cm$^2$.G. The origin of such properties has not been determined yet, but the fact that the present catalyst does not contain any tertiary ingredient, such as γ-alumina usually contained as an ingredient to serve as the carrier, which is apt to deteriorate the activity of catalyst by giving rise to solid phase reaction with MgO during steam reforming reaction under the condition of high pressure, may account for it.

Hereunder will be given full particulars of the method of manufacturing the catalyst for use in the process under the present invention and how to effect the steam reforming reaction under the present invention by the use of the resulting catalyst. The method of manufacturing this catalyst, however, is not limited to those described in the following, but the point is that it is capable of producing a nickel-magnesia catalyst to meet the foregoing requirements of the present invention. Methods of manufacturing catalysts:

[1] Method of manufacturing a catalyst through co-precipitation process:

An aqueous solution of a nickel salt selected from Ni(NO$_3$)$_2$, NiSO$_4$, NiCl$_2$, Ni(CH$_3$COO)$_2$, Ni(HCOO)$_2$, and the like, an aqueous solution of a magnesium salt selected from Mg(NO$_3$)$_2$, MgSO$_4$, MgCl$_2$, Mg(CH$_3$COO)$_2$, Mg(HCOO)$_2$, and the like and an aqueous solution of an alkali selected from NaOH, KOH, Na$_2$CO$_3$, K$_2$CO$_3$, and the like are admixed so as to obtain the ratio of components of Ni to Mg for the catalyst to be in the range of 0.5 to 5.0, — preferably 1.0 to 3.0, under the condition of the temperature being in the range of from room temperature to 90°C — preferably 30°–70°C — thereby giving rise to precipitation of the hydroxide or basic carbonate of Ni and Mg. This mixture liquid is mixed by agitating for appropriate time — for instance, 0.5 to 3 hours — while being held at a temperature as desired, thereby aging said precipitate. The resulting precipitate is filtered and then washed with a large quantity of water or if desired hot water. This washing is repeatedly conducted until the washing water after washing becomes practically free of the alkaline matters mixed initially in the form of alkaline aqueous solution, that is, until the pH value comes to be in the range of 7 to 9. The thus obtained precipitate is then dried at a temperature in the range of 40° to 130°C, mixed with less than 10 wt.% of a molding assistant such as graphite, stearic acid, etc., and molded into 1 to 10-mesh tablets by means of a tablet machine. This tablet is calcined at a temperature in the range of 300° to 800°C, preferably 400° to 700°C, whereby a nickel-magnesia catalyst having the aforesaid ratio of components is obtained.

[2] Method of manufacturing a catalyst through deposition process:

A commerical active MgO powder for industrial use, the same nickel salt and alkaline aqueous solution as those employed for the foregoing method [1] are admixed under the condition of the temperature being in the range of from room temperature to 90°C — preferably 30°–70°C while regulating the ratio of components of Ni to Mg for the catalyst to be in the range of 0.5 to 5.0, preferably 1.0 to 3.0, thereby causing the hydroxide or basic carbonate of Ni to deposit on the surface of the MgO. By subjecting the thus deposited precipitate to treatment under the same condition of operation as in the method [1], a nickel-magnesia catalyst having the aforesaid ratio of components is obtained.

[3] Method of manufacturing a catalyst by mixing:

The same nickel salt and alkaline aqueous solution as employed for the foregoing method [1] are admixed under the condition of the temperature being in the range of from room temperature to 90°C, preferably 50° to 70°C, thereby giving rise to precipitation of hydroxide or basic carbonate of Ni. This precipitate is then subjected to mixing by agitation under a desired fixed condition of temperature as set forth above, followed by filtration and washing under the same condition of operation as in the method [1].

The thus obtained precipitate is thoroughly mixed with a commercial active MgO powder for industrial use so that the ratio of components of Ni to Mg for the catalyst are in the range of 0.5 to 5.0, preferably 1.0 to 3.0. The resulting mixture is dried at a temperature in the range of 40° to 130°C and thereafter subjected to treatment under the same condition of operation as in the method [1], whereby a nickel-magnesia catalyst having the aforesaid ratio of components is obtained.

The low-temperature steam reforming according to the process under the present invention is started when a nickel-magnesia catalyst manufactured by any of the foregoing methods [1] to [3] is packed in a steam reforming reactor (or reactors) and is activated by feeding hydrogen as the reducing gas stream at a temperature in the range of 300° to 600°C, preferably 400° to 500°C, thereto. When said catalyst has been fully activated, feeding of hydrogen is discontinued, a mixture of said hydrocarbons and steam having the mixing ratio in terms of H$_2$O/C regulated to be in the range of 0.9 to 5.0 is supplied upon preheating it up to a temperature in the range of 250° to 600°C, and steam reforming reaction of said hydrocarbons is effected while maintaining the temperature of the catalyst bed of said reforming reactor(s) in the range of 300° to 600°C, preferably 400° to 570°C, whereby a methane-containing gas is produced.

The thus produced methane-containing gas usually contains more than 40% of methane on the dry basis, coupled with such associated components as hydrogen, carbon monoxide and carbon dioxide.

Further, if necessary, it is possible to produce a gas containing much more methane than the above by effecting methanation reaction of carbon oxides by feeding the gas stream coming out of said reforming reactor(s) to a methanation reactor(s).

The resulting methane-containing gas is eminently suited for use as the fuel gas.

DESCRIPTION OF THE PREFERRED EMBODIMENTS

Hereunder will be given further particulars of the present invention by reference to preferred embodiments of the present invention.

EXAMPLES 1 TO 3 AND COMPARATIVE EXAMPLES

The characteristics and properties of the catalysts for use in the process in accordance with the present invention will be further elucidated by reference to catalysts produced under the conditions shown in Table -1 below. Table-1 shows the conditions for manufacturing the nickel-magnesia catalysts M-1, M-2 and M-3 according to the present invention and the conventional nickel-magnesia-γ-alumina catalyst S-1 having a composition resembling the catalyst of the present invention most closely. Said M-1 stands for the catalyst produced by the foregoing method [1], M-2 for the catalyst produced by the method [2], and M-3 for the catalyst produced by the method [3].

Table 1

| Symbol for catalyst | Compounding ratio (Ni/Mg) | Nickel salt (gr) | Magnesium salt (gr) | Alkali salt (gr) | Tertiary ingredient (gr) | Amount of water required for overall re solu- tion (l) | Temperature for drying (°C) | Amount of graphite added per 100 gr of precipitate (gr) | Temperature for calcination (°C) | Particle size of catalyst (mesh) | Amount of catalyst produced (gr) |
|---|---|---|---|---|---|---|---|---|---|---|---|
| M-1 | 1.7 | $Ni(NO_3)_2 \cdot 6H_2O$ 290 | $Mg(NO_3)_2 \cdot 6H_2O$ 150 | $Na_2CO_3$ 250 | | 4 | 110 | 4 | 350 | 3×3 | 70 |
| M-2 | 1.24 | $NiSO_4 \cdot 6H_2O$ 290 | MgO 30 | $Na_2CO_3$ 200 | | 4 | 110 | 4 | 350 | 3×3 | 70 |
| M-3 | 1.24 | $NiSO_4 \cdot 6H_2O$ 290 | MgO 30 | $Na_2CO_3$ 200 | | 4 | 110 | 4 | 350 | 3×3 | 70 |
| S-1 | 1.7 | $Ni(NO_3)_2 \cdot 6H_2O$ 290 | $Mg(NO_3)_2 \cdot 6H_2O$ 150 | $Na_2CO_3$ 400 | $Al(NO_3)_3$ 145 | 4 | 110 | 4 | 350 | 3×3 | 70 |

Low-temperature steam reforming reaction was continuously effected for 2500 hours under the reaction conditions of 500°C in reaction temperature and 50 Kg/cm².G in reaction pressure upon packing 40 gr each of the catalysts M-1, M-2 and M-3 produced under the conditions shown in Table-1 above respectively in a reforming reactor(s) and subjecting it to reduction treatment at 450°C for about 12 hours, and supplying the starting material naphtha having 6.04 carbon atoms in average per molecule, IBP of 33°C, FBP of 122°C, specific gravity of $d_4^{14}$ 0.675 and sulfur content of 1 ppm at the rate of 200 gr/hr together with steam by setting the ratio of $H_2O$ to C at 2.0. The result was as shown respectively in Table-2 and Table-3 below.

Table-2 shows the tendency of deterioration of activity of the respective catalyst with the lapse of time for reaction when employed for effecting the low-temperature steam reforming reaction, wherein the upper numerical value in each box represents the amount of gas (l/hr) occurring with the lapse of time, while the lower numerical value as bracketed in each box represents the amount of unreacted oily hydrocarbon (gr/hr) with the lapse of time. As for the method of measurement employed in this case, the gas stream flowing out of said reactor(s) was first cooled down to 10°C at the outlet to divide it into a gaseous matter and a liquid matter, and further the unreacted oily hydrocarbon and water contained in said liquid matter were separated, whereby each content was measured.

Table 2

| No. | Example 1 | Example 2 | Example 3 | Comparative Example 1 |
|---|---|---|---|---|
| Symbol for catalyst | M-1 | M-2 | M-3 | S-1 |
| Time elapsed | | | | |
| 10 | 368 l/hr (0)gr/hr | 369 l/hr (0)gr/hr | 367 l/hr (0)gr/hr | 367 l/hr (0)gr/hr |
| 100 | 369 (0) | 368 (0) | 369 (0) | 368 (0) |

Table 2-continued

| No. | Example 1 | Example 2 | Example 3 | Comparative Example 1 |
|---|---|---|---|---|
| Symbol for catalyst | M-1 | M-2 | M-3 | S-1 |
| Time elapsed | | | | |
| 300 | 368 (0) | 368 (0) | 368 (0) | 300 (36.2) |
| 500 | 368 (0) | 367 (0) | 368 (0) | 23 (190.3) |
| 700 | 368 (0) | 368 (0) | 367 (0) | |
| 1000 | 367 (0) | 368 (0) | 368 (0) | |
| 1500 | 368 (0) | 366 (0.4) | 363 (0.6) | |
| 2000 | 363 (2.0) | 342 (13.6) | 338 (15.0) | |
| 2500 | 352 (7.9) | 328 (24.0) | 310 (27.1) | |

As is clear from the showing in Table-2 above, in the case of employment of the nickle-magnesia catalysts M-1, M-2 and M-3 according to the present invention, even after continuous operation over such a long period as 1000 hours, unreacted oily hydrocarbon was not detected, while in the case of employment of the conventional nickel-magnesia-alumina catalyst, unreacted oily hydrocarbon was detected after 300 hours' continuous operation at most, and besides, continuous operation for more than 500 hours was impossible.

In this connection, at a point of time when 100 hours' continuous operation has been conducted, the composition of the gas flowing out of the reforming reactor(s) packed with said M-1, M-2, M-3 and S-1 respectively was in the vicinity of 63 vol.% of $CH_4$, 14 vol.% of $H_2$, 22 vol.% of $CO_2$ and 0.5 vol.% of CO on dry base.

Table-3 below shows the properties of catalyst and the amount of carbon deposited on the catalyst before and after use of said M-1, M-2, M-3 and S-1 in said low-temperature steam reforming reaction.

Table 3

| No. | | Example 1 | Example 2 | Example 3 | Comparative Example 1 |
| --- | --- | --- | --- | --- | --- |
| Symbol for catalyst | | M-1 | M-2 | M-3 | S-1 |
| Time elapsed (hr) | | 1000 | 1000 | 1000 | 500 |
| Properties of catalyst | | | | | |
| specific surface area ($m^2/gr$) | before use | 41 | 60 | 61 | 180 |
| | after use | 25 | 28 | 28 | 31 |
| Ni crystallite (Å) | before use | 250 | 200 | 200 | 50 |
| | after use | 980 | 1000 | 1000 | 250 |
| carbon content (wt.%) | before use | 5.2 | 4.7 | 4.7 | 4.8 |
| | after use | 5.2 | 4.8 | 4.8 | 9.4* |

As is clear from the showing in Table-3 above too, in the case of the nickel-magnesia catalysts M-1, M-2 and M-3 according to the present invention, despite the decrease in specific surface area and the growth of Ni crystallite, the carbon content does not increase and is very stable, while in the case of the conventional catalyst S-1, even when employed for about half the period of operation employing the catalyst under the present invention, the carbon content showed the tendency to increase drastically. This increase in carbon content is considered attributable to the deposition of carbon onto the catalyst.

As will be understood from this fact, a catalyst having a tertiary ingredient such as γ-alumina widely used as a carrier exerts some bad influence upon said low-temperature steam reforming reaction and it is impossible to apply it to said reforming reaction continuously for hours, but a catalyst under the present invention is possessed of a very high activity as well as stability and can manifest a superior effect in said low-temperature steam reforming reaction.

EXAMPLES 4 – 7 AND COMPARATIVE EXAMPLES 1 – 2

Next, when low-temperature steam reforming reaction was effected by applying various nickel-magnesia catalyst according to the present invention, prepared by modifying the ratio of components of Ni to Mg as shown in Table-4 below, for the purpose of comparison of their efficiency, the result was as shown in the same table.

Table-4 shows the conditions for manufacturing catalysts having various ratios of components by employing the aforesaid method [1], but in the case of catalysts under the present invention manufactured by employing the method [2] or method [3], as long as the ratio of components applied is identical, they can manifest almost the same efficiency.

Table 4

| Symbol for catalyst | Ni/Mg (atomic ratio) | nickel salt $Ni(NO_3)_2 \cdot 6H_2O$ (gr) | magnesium salt $Mg(NO_3)_2 \cdot 6H_2O$ (gr) | amount of water required for resolution -a (l) | alkali salt $Na_2CO_3$ (gr) | amount of water required for resolution -b (l) | dropping time (hr) |
| --- | --- | --- | --- | --- | --- | --- | --- |
| m-1 | 0.3 | 150 | 440 | 3 | 330 | 3 | 1 |
| m-2 | 0.6 | 300 | 440 | 4 | 300 | 2.5 | 1 |
| m-3 | 1.7 | 290 | 150 | 2 | 250 | 2 | 1 |
| m-4 | 3.0 | 555 | 157 | 4 | 350 | 3 | 1 |
| m-5 | 4.6 | 560 | 110 | 4 | 300 | 3 | 1 |
| m-6 | 6.0 | 555 | 80 | 4 | 300 | 3 | 1 |

| Symbol for catalyst | amount of water employed for washing (l) | Na concentration in precipitate (on dry base) (wt.%) | temperature for drying (°C) | amount of graphite added per 100 gr of precipitate (gr) | temperature for calcination (°C) | particle size of catalyst (mm × mm) | amount of catalyst produced (gr) |
| --- | --- | --- | --- | --- | --- | --- | --- |
| m-1 | 30 | 0.007 | 110 | 4 | 500 | 3 × 3 | 90 |
| m-2 | 30 | 0.007 | 110 | 4 | 500 | 3 × 3 | 120 |
| m-3 | 30 | 0.006 | 110 | 4 | 500 | 3 × 3 | 70 |
| m-4 | 30 | 0.007 | 110 | 4 | 500 | 3 × 3 | 150 |
| m-5 | 30 | 0.005 | 110 | 4 | 500 | 3 × 3 | 140 |
| m-6 | 30 | 0.006 | 110 | 4 | 500 | 3 × 3 | 130 |

(Remarks)
The amount of water required for resolution -a means the amount of water used for dissolving nickel salt and magnesium salt.
The amount of water required for resolution -b means the amount of water used for dissolving alkali salt.

Low-temperature steam reforming reaction was continuously effected for 1000 hours under the reaction conditions of 500°C reaction temperature and 70 Kg/cm².G reaction pressure, by packing 15 gr each of the catalysts m-1, m-2, m-3, m-4, m-5 and m-6 produced under the conditions shown in Table-4 above, respectively, in a reforming reactor(s) and subjecting it to reduction treatment at 500°C for about 12 hours, and supplying naphtha having 6.04 carbon atoms in average per molecule, IBP of 33°C, FBP at 122°C, specific gravity of $d_4^{15}$ 0.675 and sulfur content of 1 ppm at the rate of 100 gr/hr together with steam by setting the ratio of $H_2O$ to C at 1.5. The result was as shown respectively in Table-5 and Table-6 below.

Table-5 shows the tendency of deterioration of activity of the respective catalyst with the lapse of time for reaction when employed for effecting the low-temperature steam reforming reaction, wherein the way of expression and the method of measurement are the same as that in the foregoing Table-2. Table-6 shows the change of carbon content (wt.%) in the catalyst before and after use of each catalyst in said low-temperature steam reforming reaction.

Table 5

| Time elapsed (hr) | No. | | | | | |
|---|---|---|---|---|---|---|
| | Comparative Example 1 | Example 4 | Example 5 | Example 6 | Example 7 | Comparative Example 2 |
| | Symbol for catalyst | | | | | |
| | m-1 | m-2 | m-3 | m-4 | m-5 | m-6 |
| 10 | 123 l/hr (29) gr/hr | 174 l/hr (0) gr/hr | 174 l/hr (0) gr/hr | 174 l/hr (0) gr/hr | 174 l/hr (0) gr/hr | 174 l/hr (0) gr/hr |
| 100 | 109 (37) | 174 (0) | 174 (0) | 174 (0) | 175 (0) | 158 (9) |
| 300 | 96 (44) | 174 (0) | 174 (0) | 174 (0) | 174 (0) | 84 (51) |
| 500 | 83 (52) | 168 (3) | 174 (0) | 174 (0) | 173 (0) | 23 (86) |
| 700 | 71 (59) | 160 (7) | 175 (0) | 174 (0) | 168 (3) | |
| 1000 | 59 (46) | 153 (12) | 169 (2) | 164 (5) | 162 (6) | |

As is clear from the showing in Table-5 above too, in the case of Comparative Example 1, not a little amount of unreacted oily hydrocarbon was detected after 10 hours' operation, while in the case of Comparative Example 2, unreacted oily hydrocarbon was detected after 100 hours' operation, and in both cases, the amount of unreacted oily hydrocarbon showed a tendency to increase rapidly subsequent thereto. On the contrary, in the case of Example 1 of the present invention, no unreacted oily hydrocarbon was detected even after a long period of operation. Particularly in the case of Example 5 and Example 6, no unreacted oily hydrocarbon was detected even after 700 hours' continuous operation. In this connection, when 10 hours' continuous operation has been conducted, the composition of the gas flowing out of the reforming reactor(s) packed with said m-2, m-3, m-4, m-5 and m-6 respectively was in the vicinity of 68% of $CH_4$, 9.5% of $H_2$, 0.5% of CO and 22% of $CO_2$.

Table 6

| | No. | | | | | |
|---|---|---|---|---|---|---|
| | Comparative Example 1 | Example 4 | Example 5 | Example 6 | Example 7 | Comparative Example 2 |
| | Symbol for catalyst | | | | | |
| | m-1 | m-2 | m-3 | m-4 | m-5 | m-6 |
| | Time elapsed (hr) | | | | | |
| Properties of catalyst | 1000 | 1000 | 1000 | 1000 | 1000 | 500 |
| carbon content (wt.%) before use | 0.10 | 0.05 | 0.05 | 0.08 | 0.05 | 0.08 |
| after use | 0.13 | 0.08 | 0.10 | 0.10 | 0.15 | 9.53 |

As is clear from the showing in Table-6 above too, in the case of Comparative Example 2, the carbon content (wt.%) after use showed a tendency to increase drastically. This increase in the carbon content is considered attributable to the deposition of carbon onto the surface of catalyst. This fact substantiates the aforesaid rapid increase in unreacted oily hydrocarbon.

EXAMPLES 8 TO 11 AND COMPARATIVE EXAMPLES 3 TO 4

Low-temperature steam reforming reaction was continuously effected for 100 hours under the reaction conditions of 500°C reaction temperature and 10 Kg/cm².G reaction pressure by packing 15 gr each of the nickel-magnesia catalysts m-1, m-2, m-3, m-4, m-5 and m-6 produced under the conditions shown in Table-4 above respectively in a reforming reactor(s) and subjecting it to reduction treatment at 500°C for about 12 hours, and supplying the material naphtha having 6.04 carbon atoms in average per molecule, IBP of 33°C, FBP of 122°C, specific gravity of $d_4^{15}$ 0.675 and sulfur content of 0.5 ppm at the rate of 100 gr/hr together with steam by setting the ratio of $H_2O$ to C at 2.0. The result was as shown respectively in Table-7 and Table-8 below.

In said Table-7 and Table-8, the way of expression and method of measurement are the same as that in the foregoing Table-5 and Table-6.

Table 7

| Time elapsed (hr) | No. | | | | | |
|---|---|---|---|---|---|---|
| | Comparative Example 3 | Example 8 | Example 9 | Example 10 | Example 11 | Comparative Example 4 |
| | Symbol for catalyst | | | | | |
| | m-1 | m-2 | m-3 | m-4 | m-5 | m-6 |
| 10 | 155 l/hr (26) gr/hr | 212 l/hr (0) gr/hr | 213 l/hr (0) gr/hr | 213 l/hr (0) gr/hr | 212 l/hr (0) gr/hr | 213 l/hr (0) gr/hr |
| 100 | 143 (32) | 212 (0) | 212 (0) | 212 (0) | 212 (0) | 190 (10) |
| 300 | 131 (37) | 210 (0) | 212 (0) | 211 (0) | 212 (0) | 179 (15) |
| 500 | 120 (43) | 202 (4) | 212 (0) | 212 (0) | 212 (0) | 166 (21) |
| 700 | 110 (47) | 185 (12) | 211 (0) | 212 (0) | 204 (3) | 155 (26) |
| 1000 | 101 (52) | 178 (16) | 206 (2) | 206 (2) | 196 (7) | 144 (31) |

As is clear from the showing in Table-7 above too, in the case of Comparative Example 3, not a little amount of unreacted oily hydrocarbon was already detected after 10 hours' operation, and in the case of Comparative Example 4, unreacted oily hydrocarbon was already detected after 100 hours' operation. On the contrary, in the cases of Examples 8 to 11, almost the same effect as in Examples 4 to 7 was obtained.

In this connection, when 10 hours' continuous operation has been conducted, the composition of the gas flowing out of the reforming reactor(s) packed with said m-2, m-3, m-4, m-5 and m-6 respectively was in the vicinity of 51 vol.% of $CH_4$, 26 vol.% of $H_2$, 1 vol.% of CO and 22 vol.% of $CO_2$.

Table 8

| | | No. | | | | |
|---|---|---|---|---|---|---|
| | Comparative Example 3 | Example 8 | Example 9 | Example 10 | Example 11 | Comparative Example 4 |
| | | Symbol for catalyst | | | | |
| | m-1 | m-2 | m-3 | m-4 | m-5 | m-6 |
| | | Time elapsed (hr) | | | | |
| Properties of catalyst | 1000 | 1000 | 1000 | 1000 | 1000 | 500 |
| carbon content (wt.%) before use | 0.10 | 0.05 | 0.05 | 0.08 | 0.05 | 0.08 |
| carbon content (wt.%) after use | 0.11 | 0.06 | 0.07 | 0.08 | 0.10 | 3.85 |

As is clear from the showing in Table-8 above too, in the case of Comparative Example 4, the carbon content after use showed a tendency to increase by a relatively large margin. The carbon content in this case considerably decreases as compared with the carbon content shown in Table-6, and this is considered attributable to the difference of the pressure and the ratio of $H_2O$ to C as the reaction conditions applied.

As the result of the foregoing comparative examination, it has been found that the applicable ratio of components of Ni to Mg for the nickel-magnesia catalyst under the present invention is in the range of 0.5 to 5.0, preferably 1.0 – 3.0.

Further, even in the case of effecting the low-temperature steam reforming reaction under such a high pressure as 70 Kg/cm².G, the catalyst of the present invention having the foregoing ratio of components has proved to retain such properties as high activity and high stability.

What is claimed is:

1. In a process for manufacturing a gas containing more than 40 percent of methane on a dry basis, by subjecting steam-reformable feed hydrocarbon to adiabatic low-temperature steam reforming in the presence of a nickel catalyst, the improvement which comprises preheating a mixture of said feed hydrocarbon with steam mixed in the ratio of moles of steam to the number of moles of carbon atoms in said feed hydrocarbon in the range of 0.9 to 5.0 to a temperature in the range of 250° to 600°C, feeding the preheated mixture into a steam reforming reaction zone containing a binary catalyst consisting of Ni-MgO or Ni-NiO-MgO in which the atomic ratio of nickel to magnesium is in the range of 0.5 to 5.0, and effecting steam reforming of said feed hydrocarbon under a pressure in the reaction zone in the range of 10 to 100 Kg/cm² G, while maintaining the temperature of said catalyst in the range of 300° to 600°C.

2. A process according to claim 1, in which said hydrocarbon is selected from the group consisting of refinery off gas, LPG, light naphtha, heavy naphtha and kerosene.

3. A process according to claim 1, in which reaction pressure is in the range of 30 to 100 Kg/cm².G.

4. A process according to claim 1, in which the temperature of said catalyst is maintained in the range of 400° to 570°C.

5. A process according to claim 1, in which the atomic ratio of Ni/Mg in said nickel-magnesia catalyst is in the range of 1.0 to 3.0.

* * * * *